US006084388A

United States Patent [19]
Toosky

[11] Patent Number: 6,084,388
[45] Date of Patent: Jul. 4, 2000

[54] SYSTEM AND METHOD FOR LOW POWER START-UP CIRCUIT FOR BANDGAP VOLTAGE REFERENCE

[75] Inventor: Zabih Toosky, Santa Cruz, Calif.

[73] Assignee: Infineon Technologies Corporation, San Jose, Calif.

[21] Appl. No.: 09/163,739

[22] Filed: Sep. 30, 1998

[51] Int. Cl.[7] .............................. G05F 3/16; H02M 7/122

[52] U.S. Cl. .............................................. 323/313; 363/49

[58] Field of Search .................................... 323/312, 313, 323/314, 315, 901; 327/539, 542; 363/49

[56] References Cited

U.S. PATENT DOCUMENTS 4,340,851 7/1982 Nishikawa .............................. 323/311
4,839,535 6/1989 Miller ...................................... 327/542
5,712,776 1/1998 Palara et al. .............................. 363/49
5,867,013 2/1999 Yu .......................................... 323/314

*Primary Examiner*—Y. J. Han

[57] ABSTRACT

A start-up circuit with lower current requirements than a conventional start-up circuit is disclosed. The start-up circuit may achieve lower current requirements by reducing the current of the start-up circuit to approximately zero when the bandgap circuit reaches a predetermined value. For example, the start-up circuit may peak at a current of 3.3 micro Amps in order to ensure that the bandgap circuit reaches the predetermined voltage. Thereafter, the current for the start-up circuit may be reduced to approximately zero once the bandgap circuit no longer requires the start-up circuit.

19 Claims, 7 Drawing Sheets

SYSTEM AND METHOD FOR LOW POWER START-UP CIRCUIT FOR BANDGAP VOLTAGE REFERENCE

FIELD OF THE INVENTION

The present invention relates to electronic circuits. In particular, the present invention relates to a start-up circuit for a bandgap voltage reference circuit.

BACKGROUND OF THE INVENTION

Voltages in a circuit may be measured against a reference voltage that is a known quantity. A bandgap circuit may produce such a voltage reference. FIG. 1 is a block diagram of a bandgap circuit 102 coupled with a start-up circuit 100. Temperature-independent biasing and low temperature coefficient reference voltages are often required in integrated circuit design. Band-gap reference is a circuit which generates a low temperature coefficient reference by summing base emitter voltage ($V_{BE}$) of a bipolar transistor and a weighted $V_T$, where V=voltage and T=temperature. Once the bandgap voltage reference has been established, all other voltages may be measured against the reference voltage.

The bandgap circuit 102 is typically coupled with a start-up circuit 100. Typically, the main purpose of the start-up circuit 100 is to start the bandgap circuit 102. The start-up circuit 100 may ensure that the bandgap circuit 102 operates within a valid operating point. As source voltage ($V_{dd}$) ramps from zero volts to a final value, such as 5V, the bandgap circuit 102 should reach its final value as well. Since it is possible for the bandgap circuit 102 to remain at zero current and zero voltage, one of the start-up circuit's functions is to ensure that the bandgap circuit 102 does not remain at zero current and zero voltage.

Such a combination of bandgap circuit 102 and start-up circuit 100 may be used for various applications. For example, these types of circuits may be used in a digital to analog converter or an analog to digital converter.

A potential problem for the start-up circuit 100 is that it tends to draw excessive current. The conventional start-up circuit 100 typically requires a current of approximately 100 micro Amps during and after the bandgap circuit reaches its typical goal value of approximately 1.25V. It would be desirable to reduce the current requirements of the start-up circuit 100 since, typically, low power circuits are more reliable than high power circuits. Additionally, if the combination of the start-up circuit 100 and the bandgap circuit 102 were used in an application requiring a battery, the limited power available through the battery may quickly expire when used with a circuit having high current requirements. Another potential problem is the heating of the circuit due to the high current required by the conventional start-up circuit 100. Since many integrated circuits include devices that are in close proximity to each other, it is typically desirable to run circuits at a relatively low current for heat management purposes.

It would be desirable for a start-up circuit to run on less current and, accordingly, be more efficient, more reliable, and have better heat management. The present invention addresses such a need.

SUMMARY OF THE INVENTION

The present invention relates to a start-up circuit with lower current requirements than a conventional start-up circuit. An embodiment of the present invention achieves lower current requirements by reducing the current of the start-up circuit to approximately zero when the bandgap circuit reaches a predetermined value. For example, the start-up circuit, according to an embodiment of the present invention, may peak at a current of 3.3 micro Amps in order to ensure that the bandgap circuit reaches the predetermined voltage. Thereafter, the current for the start-up circuit may be reduced to approximately zero once the bandgap circuit no longer requires the start-up circuit.

A method according to an embodiment of the present invention for starting a bandgap circuit is presented. The method comprises providing current to a start-up circuit, wherein a peak value of the current to the start-up circuit is approximately less than 7 micro Amps. Voltage to a bandgap circuit is also provided, wherein the bandgap circuit is coupled with the start-up circuit. The method also includes determining whether at least a portion of the bandgap circuit has reached a predetermined voltage value; and causing the current to the start-up circuit to approach zero if the portion of the bandgap circuit has reached the predetermined voltage value.

In another aspect of the invention, a system according to an embodiment of the present invention for starting a bandgap circuit is also presented. The system comprises a first device configured to flow current into a bandgap circuit. It also includes a second device with an output, the second device being coupled with the bandgap circuit, and the second device being configured to switch its output toward ground if a first predetermined voltage of at least a portion of a bandgap circuit is reached. A third device coupled with the second device is also included, wherein the third device is configured to cause the first device to turn off when the third device reaches a voltage approximately equaling a second predetermined voltage.

DETAILED DESCRIPTION OF THE PREFERRED EMBODIMENTS

The following description is presented to enable one of ordinary skill in the art to make and to use the invention and is provided in the context of a patent application and its requirements. Various modifications to the preferred embodiments will be readily apparent to those skilled in the art and the generic principles herein may be applied to other embodiments. Thus, the present invention is not intended to be limited to the embodiment shown but is to be accorded the widest scope consistent with the principles and features described herein.

According to an embodiment of the present invention, a system and method for a low, quiescent power start-up circuit are presented. This start-up circuit only requires current for a very short time. For example, the current requirements of the start-up circuit, according to an embodiment of the present invention, may be 6 micro Amps or less (less than 7 micro Amps), applied for a period of approximately one to three micro seconds.

Figure 1:
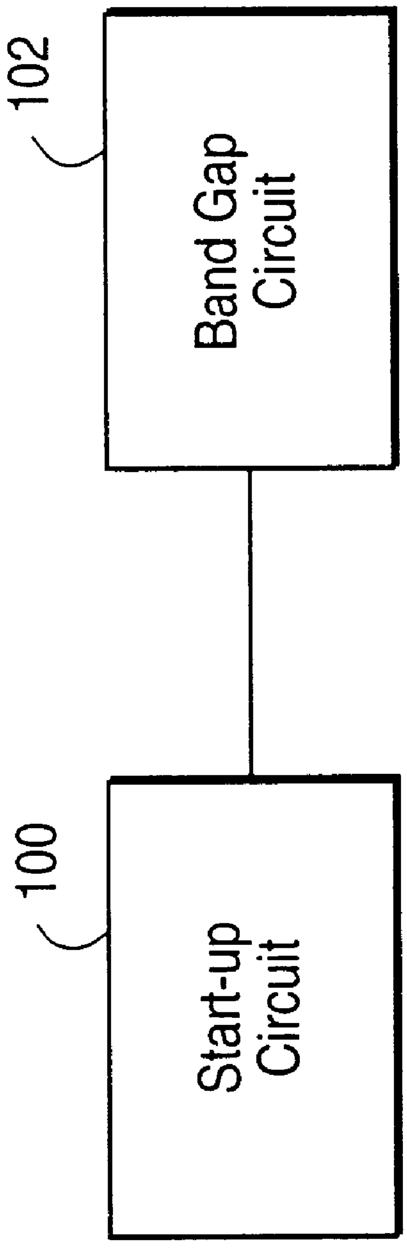
FIG. 1 is a block diagram of a bandgap circuit coupled with a start-up circuit.
Figure 2:
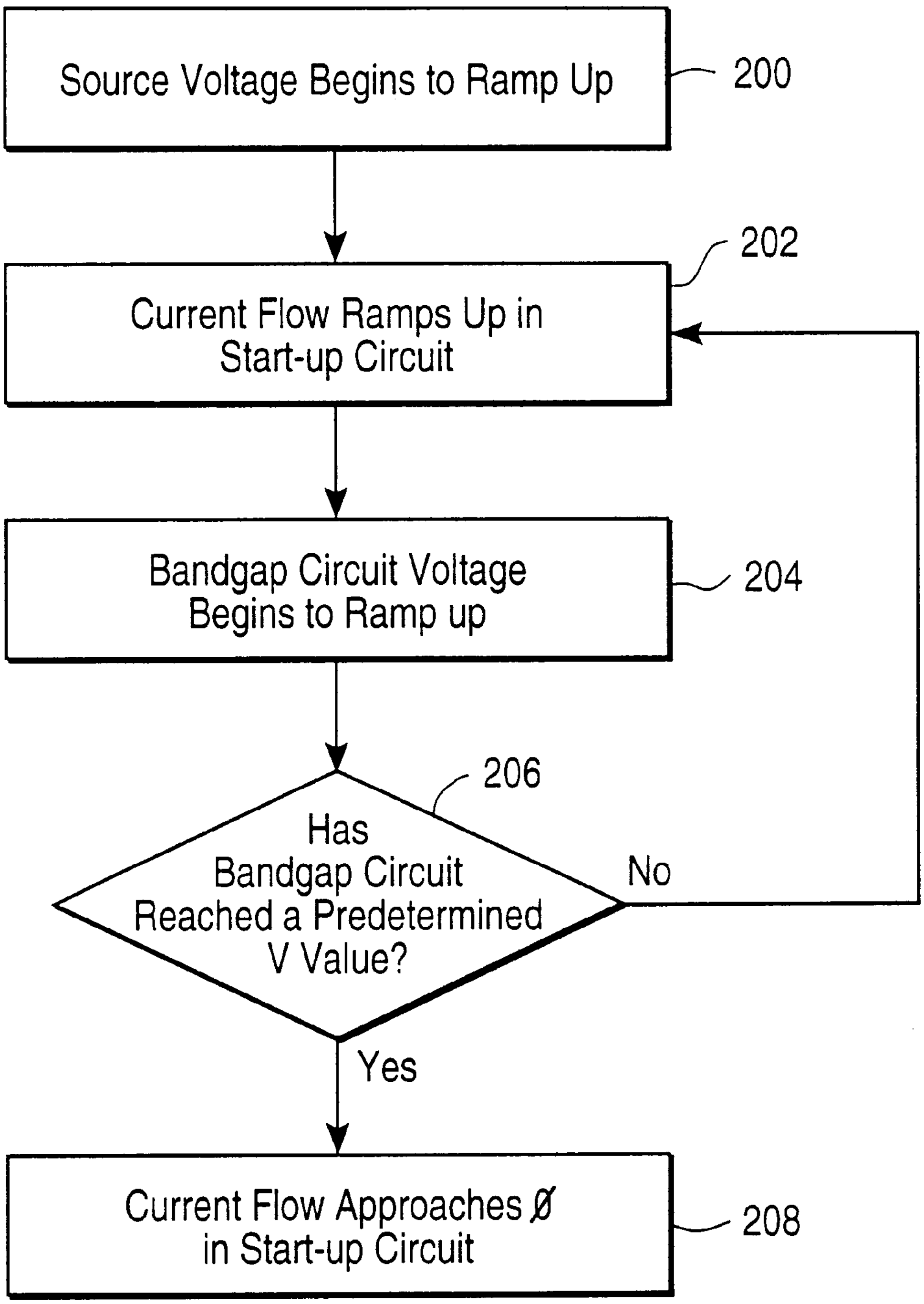
FIG. 2 is a flow diagram of a method, according to an embodiment of the present invention, for starting a bandgap circuit.

FIG. 2 is a flow diagram of a method according to an embodiment of the present invention for starting up a bandgap circuit. A source voltage begins to ramp up from zero volts (step 200). Current flowing in a start-up circuit, coupled to a bandgap circuit, also ramps up from zero Amps (step 202). Voltage in the bandgap circuit then begins to ramp up in response to the start-up circuit (step 204). It is then determined whether the bandgap circuit has reached a predetermined voltage value (step 206). The predetermined voltage value of the bandgap circuit is preferably a voltage that is high enough to ensure that the bandgap circuit will reach a target bandgap reference voltage. An example of a target bandgap reference voltage may be 1.25V, while an example of a predetermined voltage value of the bandgap circuit at which point the start-up circuit begins to reduce its current flow may be approximately 800–900 mV.

If the bandgap circuit has not yet reached the predetermined voltage value, then the current flow continues to ramp up in the start-up circuit (step 202). If, however, the bandgap circuit has reached the predetermined voltage value, then the current flow in the start-up circuit begins to approach zero (step 208). An example of a peak of current flow in the start-up circuit prior to initiating the downward approach to zero Amps is 3.3 micro Amps.

Figure 3:
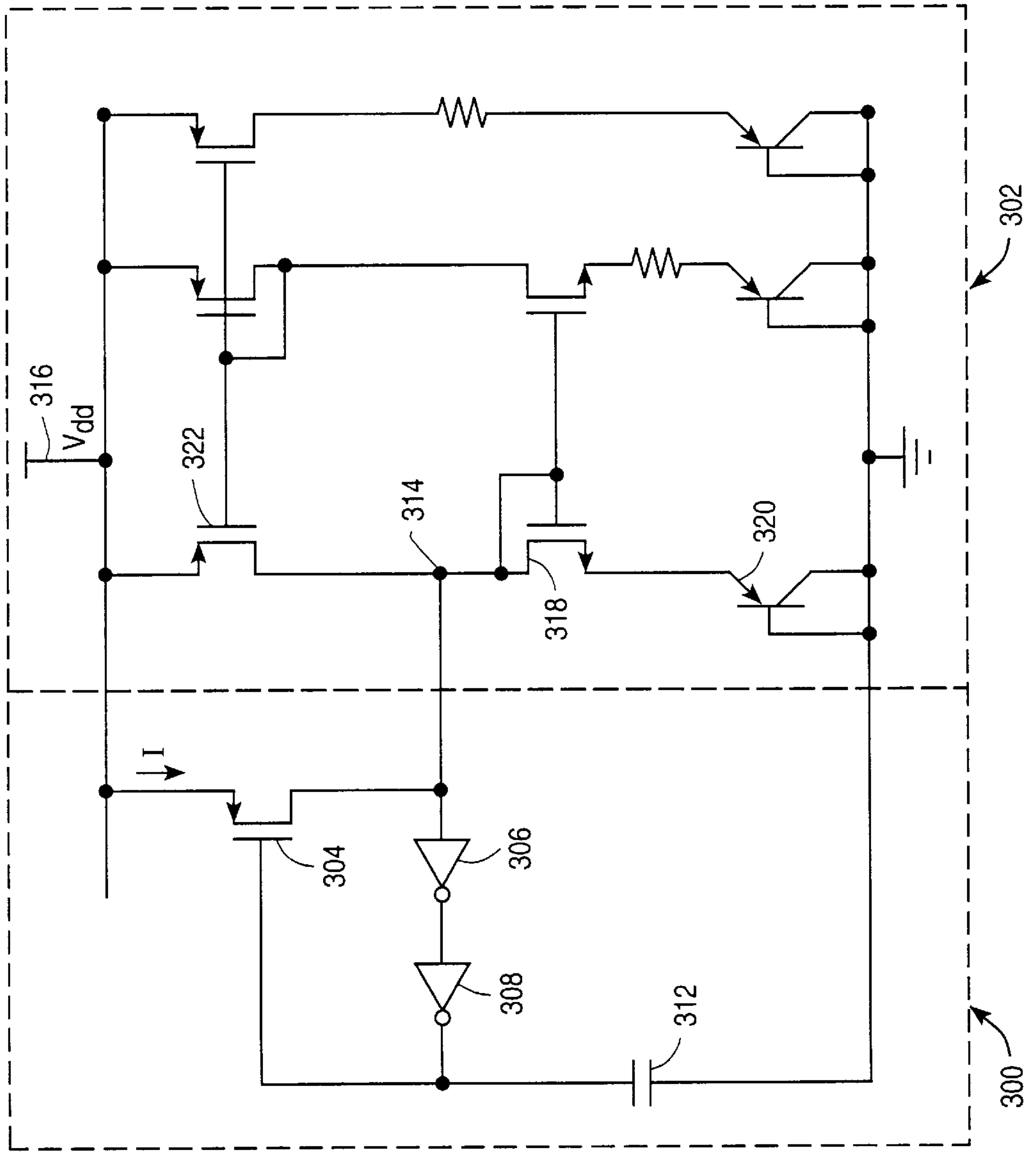
FIG. 3 is a schematic diagram of a start-up circuit coupled with a bandgap circuit according to an embodiment of the present invention.
Figure 4:
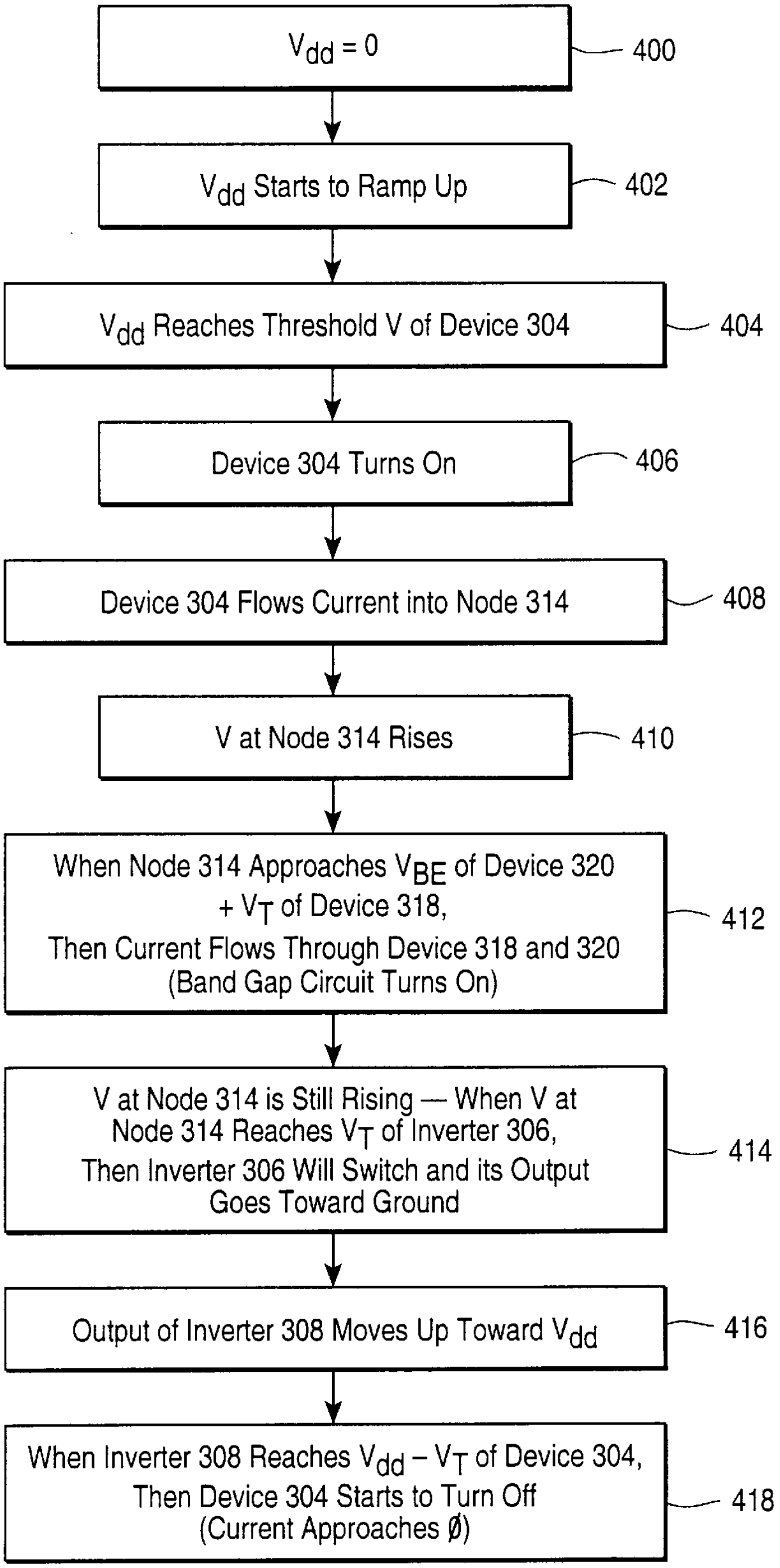
FIG. 4 is another flow diagram of a method according to an embodiment of the present invention for starting a bandgap circuit.

FIG. 3 is a schematic diagram of a start-up circuit 300, according to an embodiment of the present invention. The start-up circuit 300 is shown to be coupled with a bandgap circuit 302. The schematic diagram shown in FIG. 3 are herein described in conjunction with the flow diagram of FIG. 4. FIG. 4 is another flow diagram of a method, according to an embodiment of the present invention, for starting a bandgap circuit.

The start-up circuit 300 of FIG. 3 is shown to include a transistor device 304 coupled a source voltage 316. Device 304 may be a Positive Channel Metal Oxide Semiconductor (PMOS) device with its size adjusted for a predetermined peak start-up current, such as 3.3 micro Amps. Device 304 is also shown to be coupled with a capacitor 312. Device 304 and capacitor 312 are also shown to be coupled with inverters 308 and 306. Inverters 308 and 306 may be an N-channel Metal Oxide Semiconductor (NMOS). Inverter 306 and Device 304 are also coupled with a node 314 of bandgap circuit 302.

According to the examples shown in FIGS. 3 and 4, source voltage ($V_{dd}$) 316 is initially zero (step 400). Source voltage 316 then starts to ramp up from zero (step 402). The source voltage 316 then reaches a threshold voltage of device 304 (step 404). An example of a threshold voltage of device 304 is approximately 900 mV, with a range of approximately 750 mV to 1V. Once the threshold voltage of device 304 is reached, device 304 is then turned on (step 406). Device 304 turns on because its gate is held at ground due to capacitor 312 not being charged. Device 304 then flows current into node 314 of the bandgap circuit 302 (step 408). The voltage at node 314 then rises (step 410). Capacitor 312 adds some delay and ensures that node 314 is at zero voltage at initial condition. Delay caused by capacitor 312 allows device 304 enough time to flow current into node 314, raise the voltage at node 314, and start the bandgap circuit 302. An example of an amount of delay, which may be required, is approximately several nanoseconds, such as 7–10 nanoseconds.

When node 314 approaches a base emitter voltage ($V_{BE}$) of device 320 plus the threshold voltage ($V_t$) of device 318, then current flows through device 318 and device 320 (bandgap circuit 302 turns on) (step 412). Device 320 may be a bipolar PNP device with a base emitter voltage of approximately 600 mV, with a range of approximately 600 mV to 700 mV. A PNP transistor is a bipolar junction transistor in which the emitter and collector layers are p-type semiconductor material.

The voltage at node 314 continues to rise, and when voltage at node 314 reaches threshold voltage of inverter 306, then inverter 306 switches its output to shift towards ground (step 414). An example of a range of threshold voltage of inverter 306 is approximately 600 mV to 900 mV.

The output of inverter 308 then moves up toward source voltage 316 (step 416). When inverter 308 reaches source voltage minus threshold voltage of device 304, then device 304 begins to turn off (current approaches zero) (step 418).

Figure 5:
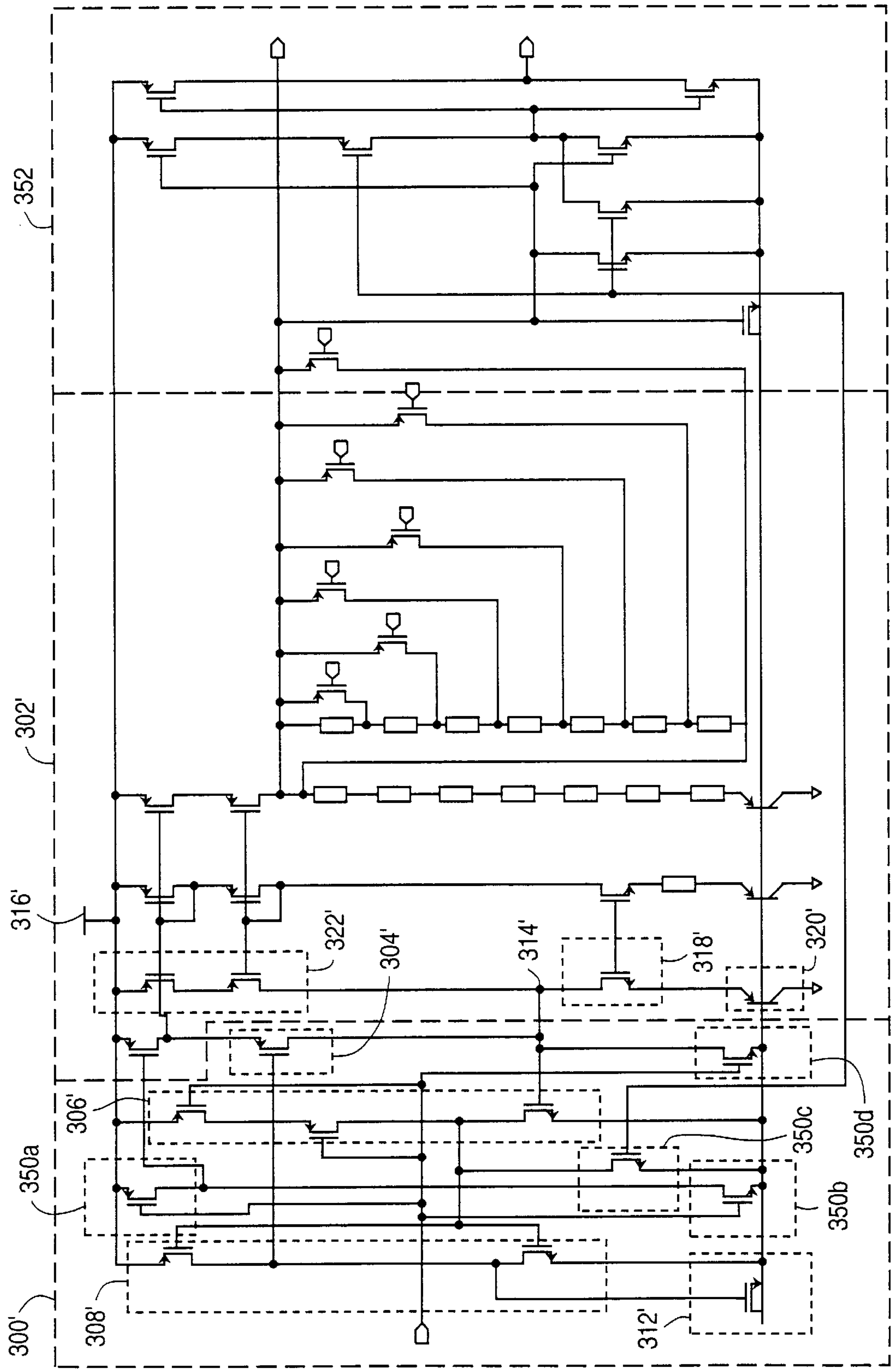
FIG. 5 is another schematic diagram of a start-up circuit coupled with a bandgap circuit, according to an embodiment of the present invention.

FIG. 5 is another schematic diagram of a start-up circuit 300', according to an embodiment of the present invention, shown to be coupled with a bandgap circuit 302'. The bandgap circuit 302' is in turn coupled with a power-on-reset generator 352. The function of the power-on-reset generator 352 is to generate a signal when power is first turned on to reset all registers within a circuit to a known value.

The devices discussed in conjunction with the circuits shown in FIG. 3 are likewise labeled in the circuits shown in FIG. 5. In addition to the devices that were shown in FIG. 3, the start-up circuit 300' is also shown to include devices **350*a*–350*d*. Devices 350*a*–350*d* are shut-down devices that are not critical to the function of the start-up circuit 300'. Shut-down devices 350*a*–350*d* may be used when an application requires all of the circuits, including start-up circuit 300', bandgap circuit 302' and any other circuit coupled to these circuits, such as the power-on-reset generator 352, to be turned off. Devices 350*a*–350*d* may respond to a shut-down signal originating from outside these circuits. Devices 350*a*–350*d* do not play a part in the function of starting up the bandgap circuit 302'** and are an optional design choice.

Figure 6A:
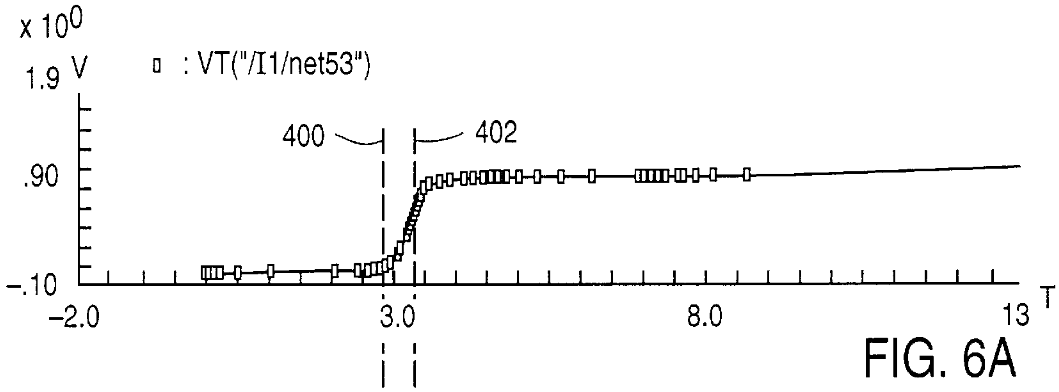
FIGS. 6*a*–6*d* are graphs illustrating an example of relationships between currents and voltages of various components over time, according to an embodiment of the present invention.
Figure 6B:
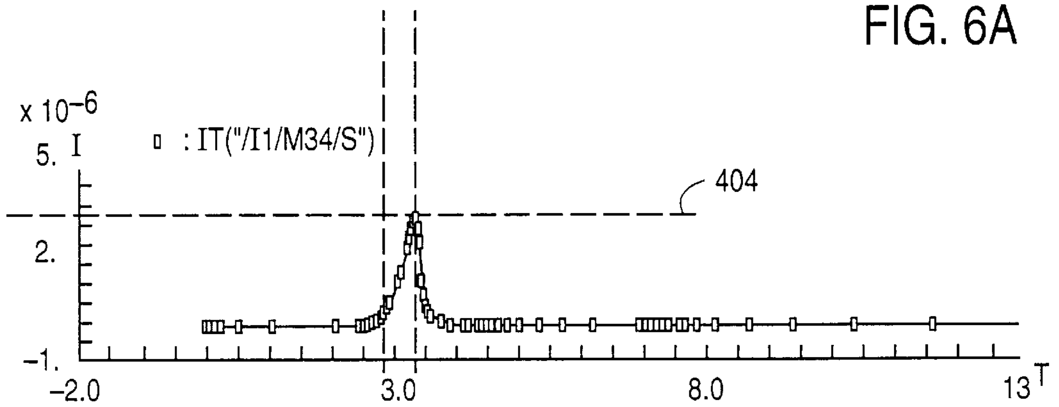
Figure 6C:
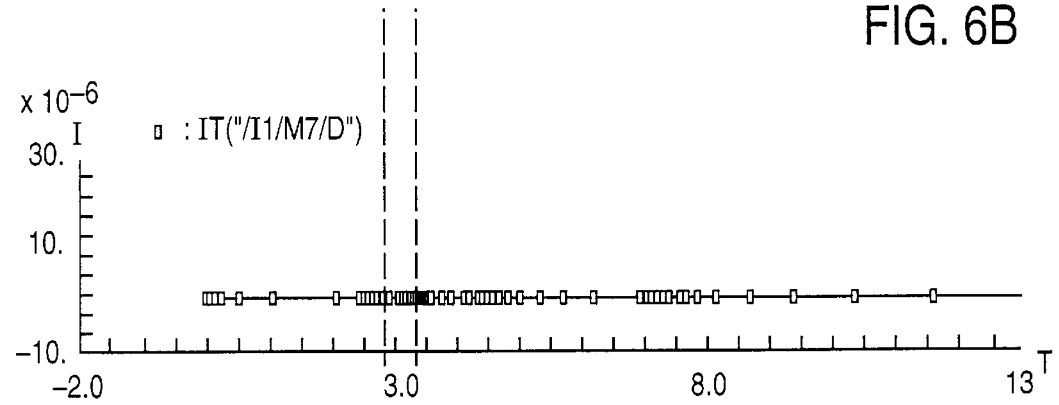
Figure 6D:
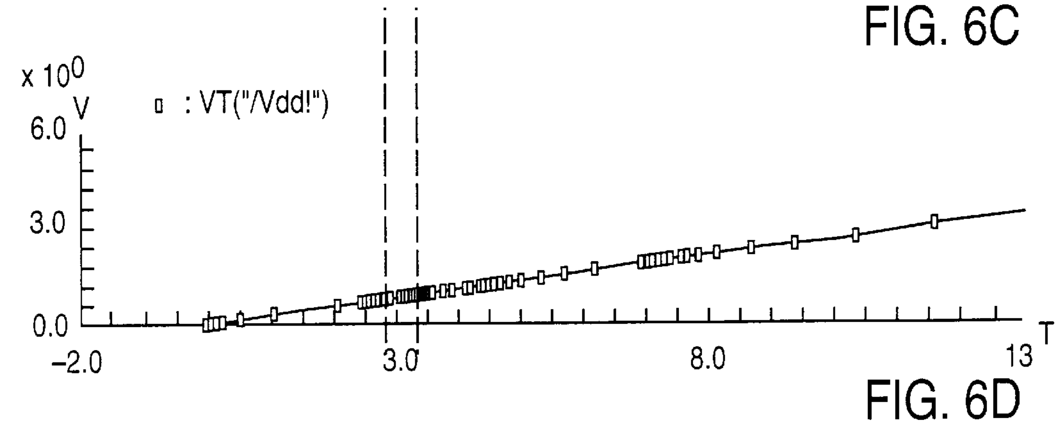

FIGS. **6*a*–6*d* show a set of graphs illustrating an example of relationships between voltages and currents of various components of a start-up circuit, such as start-up circuits 300 of FIG. 3 and 300' of FIG. 5, according to an embodiment of the present invention. The horizontal axis of FIGS. 6*a*–6*d* indicate time; the vertical axis of FIG. 6*a* and FIG. 6*d* indicate voltage; and the vertical axis of FIGS. 6*b* and 6*c* indicate current. The graph shown in FIG. 6*a* shows voltage over time for node 314 of FIG. 3 and node 314' of FIG. 5. The graph of FIG. 6*b* shows current over time flowing through device 304 of FIG. 3 and 304' of FIG. 5. The graph of FIG. 6*c* shows current over time flowing through the bandgap circuit 302 of FIG. 3 and 302' of FIG. 5. The graph shown in FIG. 6*d* shows voltage over time of source voltage 316 of FIG. 3 and 316' of FIG. 5**.

As shown in FIGS. **6*a* and 6*b*, as the current flowing through device 304 increases at time 400, the voltage of node 314 also increases starting at time 400. As the current flowing through device 304 reaches a maximum peak at current level 404 at time 402, the voltage at node 314 also begins to reach its predetermined voltage at time 402. An example of current at the current peak for device 304 is 3.3 micro Amps at point 404. The peak current at point 404 need only remain at that current level for approximately less than one micro second. Thereafter, the current through device 304 drops and approaches zero. According to an embodiment of the present invention, the time during which the current flows through device 304**, is very short, for example, one micro second to three micro seconds.

Figure 7A:
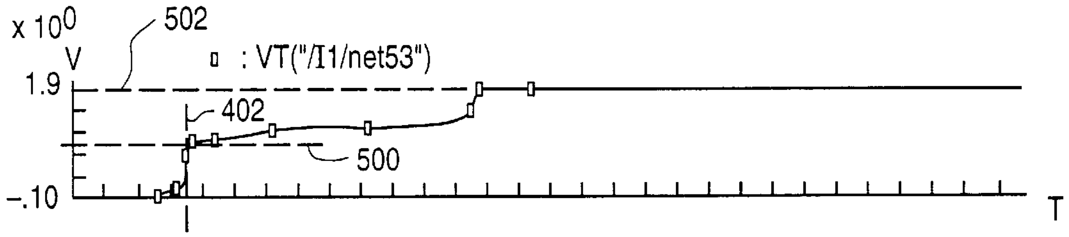
FIGS. 7*a*–7*c* are graphs illustrating an example of relationships between currents and voltages of various components over a longer period of time than that shown in FIGS. 6*a*–6*d*.
Figure 7B:
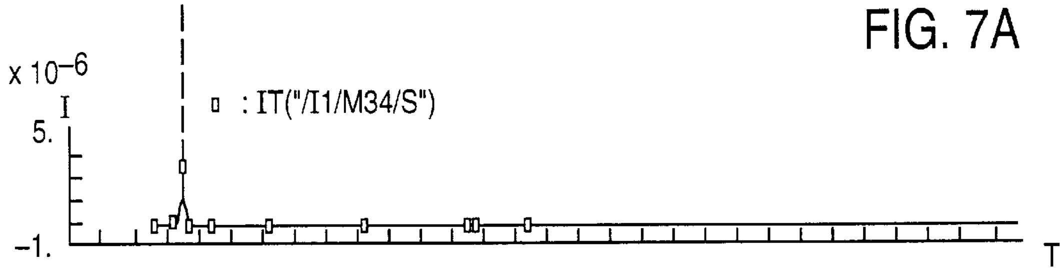
Figure 7C:
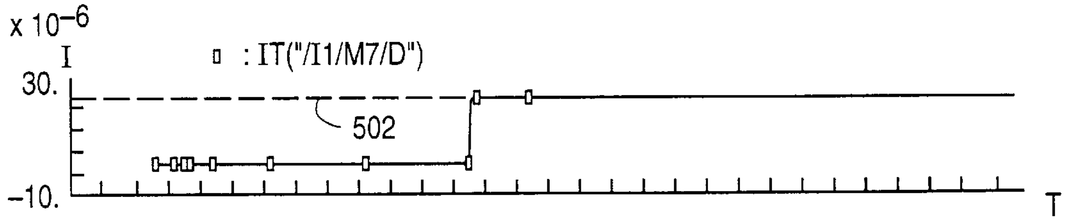

FIGS. 7*a*–7*c* show graphs illustrating a relationship between various components of the start-up circuit according to an embodiment of the present invention. FIGS. 7*a*–7*c* correspond to FIGS. 6*a*–6*c*, respectively, over a longer period of time. Accordingly, FIG. 7*a* shows a graph of voltage versus time at node 314, FIG. 7*b* shows a graph of current versus time for current flowing through device 304, and FIG. 7*c* shows a graph of current versus time for the bandgap circuit current. As seen through FIGS. 7*a*–7*b*, enough current flows through device 304 for just enough time to boost the voltage of node 314 to reach a predetermined voltage at point 500. As previously discussed, the approximate predetermined voltage value of point 500 is determined when the voltage at node 314 reaches a threshold voltage of inverter 306 of FIG. 3 and 306' of FIG. 5, triggering the drop of current through device 304 as described in conjunction with steps 412–418 of FIG. 4. The threshold voltage of inverter 306 is preferably determined such that it is below the bandgap voltage reference of approximately 1.25V so that the threshold voltage may be reached to turn off the start-up circuit's current. The threshold voltage is also preferably a high enough voltage so that the bandgap circuit will start up. As previously mentioned, an example of a range of threshold voltage of inverter 306 may be approximately 800–900 mV. A ratio of the size of the PMOS device to the size of the NMOS device may be adjusted to obtain the proper threshold voltage of inverter 306.

After node 314 reaches the predetermined voltage at point 500, the voltage continues to rise until its reaches a predetermined reference voltage 502. For example, as previously mentioned, the predetermined reference voltage 502 may be approximately 1.25 voltage.

Although the present invention has been described in accordance with the embodiment shown, one of ordinary skill in the art will readily recognize that there could be variations to the embodiment and these variations would be within the spirit and scope of the present invention. Accordingly, many modifications may be made by one of ordinary skill in the art without departing from the spirit and scope of the appended claims.

What is claimed is:

1. A method for starting a bandgap circuit, the method comprising:

providing current to a start-up circuit, wherein a peak value of the current to the start-up circuit is approximately less than 7 micro Amps;

providing voltage to a bandgap circuit coupled with the start-up circuit;

determining whether at least a portion of the bandgap circuit has reached a predetermined voltage value; and causing the current to the start-up circuit to approach zero if the portion of the bandgap circuit has reached the predetermined voltage value.

2. The method of claim 1, wherein a peak value of the current to the start-up circuit is approximately 3.3 micro Amps.

3. The method of claim 1, wherein the predetermined voltage value is approximately 800–900 mV.

4. The method of claim 1, wherein the predetermined voltage value is a threshold voltage of an inverter.

5. The method of claim 1, further comprising continuing to provide the current to the start-up circuit if the bandgap circuit has not reached the predetermined voltage value.

6. The method of claim 1, wherein the current to the start-up circuit is applied for approximately 1–3 micro seconds.

7. The method of claim 1, wherein a peak value of the current to the start-up circuit is applied for approximately less than one micro second.

8. A system for starting a bandgap circuit, the system comprising:

means for providing current to a start-up circuit, wherein a peak value of the current to the start-up circuit is approximately less than 7 micro Amps;

means for providing voltage to a bandgap circuit coupled with the start-up circuit;

means for determining whether at least a portion of the bandgap circuit has reached a predetermined voltage value; and means for causing the current to the start-up circuit to approach zero if the portion of the bandgap circuit has reached the predetermined voltage value.

9. The system of claim 8, wherein the predetermined voltage value is approximately 800–900 mV.

10. A system for starting a bandgap circuit, the system comprising:

a first device configured to flow current into a bandgap circuit;

a second device with an output, the second device being coupled with the bandgap circuit, and the second device being configured to switch its output toward ground if a first predetermined voltage of at least a portion of a bandgap circuit is reached;

a third device coupled with the second device, the third device being configured to cause the first device to turn off when the third device reaches a voltage approximately equaling a second predetermined voltage.

11. The system of claim 10, wherein the first device is a transistor.

12. The system of claim 10, wherein the second device is an inverter.

13. The system of claim 10, wherein the first predetermined voltage is a voltage at a node in the bandgap circuit, wherein the voltage at the node approximately equals a threshold voltage of the second device.

14. The system of claim 10, wherein the second predetermined voltage is approximately equal to a difference between a source voltage and a threshold voltage of the first device.

15. The system of claim 10, wherein the third device is an inverter.

16. The system of claim 10, wherein the first predetermined voltage is approximately 800–900 mV.

17. The system of claim 10, wherein a peak value of a current to the first device is approximately less than 7 micro Amps.

18. The system of claim 17, wherein the peak value of the current to the first device is applied for approximately less than one micro second.

19. The system of claim 10, wherein a current to the first device is applied for approximately 1–3 micro seconds.

* * * * *